United States Patent [19]
Patel

[11] 3,950,735
[45] Apr. 13, 1976

[54] METHOD AND APPARATUS FOR DYNAMICALLY CONTROLLING READ/WRITE OPERATIONS IN A PERIPHERAL SUBSYSTEM

[75] Inventor: Shirish Patel, Waltham, Mass.

[73] Assignee: Honeywell Information Systems, Inc., Waltham, Mass.

[22] Filed: Jan. 4, 1974

[21] Appl. No.: 430,837

[52] U.S. Cl.............................. 340/172.5; 360/73
[51] Int. Cl.² .......................................... G06F 3/06
[58] Field of Search... 340/172.5, 174.1 G, 174.1 H, 340/174.1 R; 360/51, 73

[56] References Cited
UNITED STATES PATENTS

| | | | |
|---|---|---|---|
| 3,340,512 | 9/1967 | Hauck et al. | 340/172.5 |
| 3,370,276 | 2/1968 | Schell, Jr. | 340/172.5 |
| 3,417,378 | 12/1968 | Simonsen et al. | 340/172.5 |
| 3,434,117 | 3/1969 | Gibson et al. | 340/172.5 |
| 3,445,820 | 5/1969 | Wissick | 340/172.5 |
| 3,654,617 | 4/1972 | Irwin | 340/172.5 |
| 3,676,859 | 7/1972 | Hollaway et al. | 340/172.5 |
| 3,714,635 | 1/1973 | Hamilton et al. | 340/172.5 |
| 3,753,232 | 8/1973 | Sporer | 340/172.5 |

*Primary Examiner*—Gareth D. Shaw
*Assistant Examiner*—John P. Vandenberg
*Attorney, Agent, or Firm*—Faith F. Driscoll; Ronald T. Reiling

[57] ABSTRACT

A peripheral subsystem includes a peripheral control unit coupled to a plurality of peripheral devices having different read/write speeds. In response to a command from a central processing unit, the peripheral control unit selects one of the devices designated in the command, and polls the device to obtain an indication of the read/write speed of that device. From this speed indication and a density designation included in the command, the peripheral control unit produces a read/write pulse constant which defines the rate at which data is to be read from or applied to the selected peripheral device. Data is then applied to or read from the selected device at the rate defined by the constant.

11 Claims, 4 Drawing Figures

METHOD AND APPARATUS FOR DYNAMICALLY CONTROLLING READ/WRITE OPERATIONS IN A PERIPHERAL SUBSYSTEM

BACKGROUND OF THE INVENTION

This invention relates to data processing systems and more particularly to method and apparatus for dynamically varying the rate at which data is written in or read from peripheral devices.

A peripheral subsystem of a data processing system typically includes one or more peripheral devices for storing or reproducing data and a peripheral control unit for controlling the transfer of the data between the peripheral devices and a central processing unit (CPU). The CPU directs the operations performed by the peripheral control unit through commands contained in programs stored in and executed by the CPU. Commands are supplied to the peripheral control unit which processes the commands, carries out the indicated operations, and supplies appropriate status information to the CPU.

Although a variety of operations may be carried out by the peripheral control unit in response to commands from the CPU, the ultimate operation is either applying data to or reading data from the peripheral devices. Devices commonly used for storing data include magnetic tape units, magnetic disk units and the like. For each type unit, there is generally a variety of different models, some of which have different read/write capabilities such as read/write operating speed, i.e., speed at which the storing medium (e.g. tape or disk) moves. Obviously, the flexibility and therefore attractiveness of a data processing system would be enhanced if the system and its peripheral control units had the capability of operating with a plurality of peripheral devices having different read/write capabilities.

In systems in current use, the logic of the peripheral control units used in such systems is hard wired to enable the peripheral control units to operate with certain specific peripheral device models. If such peripheral control units are to operate with peripheral device models other than those for which the control units were originally designed, then hardware logic changes must be made in the control units so that they will be compatible with the other devices. For example, such changes might include modification of the read/write timing of the peripheral control units to enable the units to function with the added peripheral devices. Such logic changes and modifications, of course, are both time consuming and costly.

SUMMARY OF THE INVENTION

It is an object of the present invention to provide a novel method and apparatus in a peripheral subsystem for automatically determining the operating capability of a selected peripheral device and for conditioning a peripheral control unit to operate with that device.

It is another object of the present invention to provide such a method and apparatus which allows the coupling to the peripheral control unit of peripheral devices having differing operating capabilities without the necessity of making a hardware logic change in the peripheral control unit.

It is still another object of the present invention to provide a peripheral subsystem in which a selected peripheral device is polled by a peripheral control unit to determine the device's operating capabilities and then certain logical conditions are established in the peripheral control unit to enable operation with the selected device.

These and other objects of the present invention are illustrated in a specific embodiment in which a peripheral control unit in response to a command from a control processing unit, polls a selected peripheral device to which it is coupled and receives therefrom an indication of the operating speed of the device. The peripheral control unit determines from this indication the rate at which data is to be applied to or retrieved from the selected device. Apparatus in the peripheral control unit then causes the application of data to or the retrieval of data from the selected device at the rate determined. In this manner, the peripheral control unit adapts itself to operate with a selected peripheral device regardless of the operating speed of the device.

BRIEF DESCRIPTION OF THE DRAWINGS

A complete understanding of the present invention and of the above and other objects and advantages thereof may be gained from a consideration of the following detailed description of a specific illustrative embodiment presented in connection with the accompanying drawings in which.

DETAILED DESCRIPTION

Figure 1:
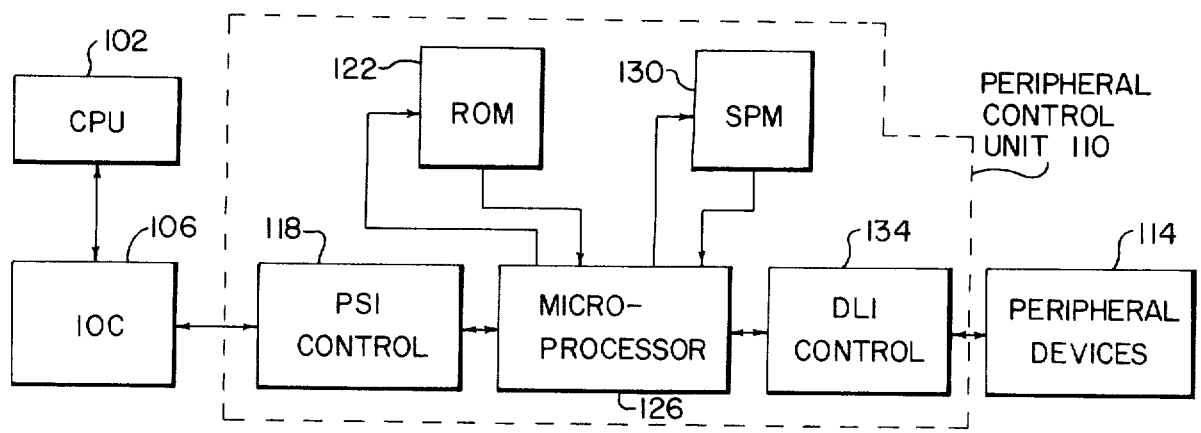
FIG. 1 shows a generalized peripheral subsystem coupled to a central processing unit of a data processing system.

Referring now to FIG. 1, there is shown an exemplary peripheral subsystem coupled via an input/output controller (IOC) 106 to a central processing unit (CPU) 102 of a data processing system. The peripheral subsystem includes one or more peripheral devices 114 and a peripheral control unit 110 coupled between the IOC 106 and the peripheral devices 114. The peripheral devices 114 illustratively could be magnetic tape units, magnetic disk files, and the like for recording and reproducing data. The data recorded on the peripheral devices 114 is supplied by the CPU 102 via the IOC 106 to the peripheral control unit 110. The peripheral control unit 110, in response to commands from the CPU 102 processes the data (translates the data, performs packing, etc.) and applies it to the appropriate one of the peripheral devices 114. Also, in response to commands from the CPU 102, the peripheral control unit 110 reads data from a designated one of the peripheral devices 114, processes the data (performs translation, depacking, etc.) and supplies the data to the IOC 106 and CPU 102.

For the sake of explanation, it should be understood that there could be additional peripheral subsystems similar to that of FIG. 1 coupled to the CPU 102. The different peripheral control units and corresponding peripheral devices may be referred to as logical channels and identified by logical channel numbers. That is, each logical channel identifies a particular peripheral control unit and one associated peripheral device. Data transfer operations performed by a logical channel are specified by a channel program located in the CPU 102. Such a channel program is always associated with a particular logical channel and includes a complete set of instructions and addressing information for carrying out a data transfer operation.

The peripheral control unit 110 includes a peripheral subsystem interface (PSI) control 118 coupled by data and control signal lines to the IOC 106, a microprocessor 126 coupled to the PSI control 118, a read only memory (ROM) 122 and scratch pad memory (SPM) 130, both coupled to the microprocessor 126, and a device level interface (DLI) control 134 coupled to the microprocessor 126 and by data and control signal lines to the peripheral devices 114. The PSI control 118 includes logic and data storage for interfacing with the IOC 106. Illustratively, the PSI control 118 includes a register for temporarily storing commands and data transferred between the IOC 106 and the peripheral control unit 110, logic for controlling such transfers, and perhaps translators for translating data to be transferred to or received from the IOC 106. If packing and unpacking of data is required, then the logic for doing this could also be included in the PSI control 118. An illustrative embodiment of the PSI control 118 is described in copending application, filed by D. Riikonen on Jan. 4, 1974, Ser. No. 430,838.

The microprocessor 126 performs data processing operations necessary for effecting the transfer of data between the peripheral devices 114 and the CPU 102. These operations are specified by micro-instructions stored in the ROM 122. Specifically, the microprocessor 126 responds to commands received from the CPU 102 and reads (from the ROM 122) and executes the micro-instructions necessary to perform the operations specified by the command.

The ROM 122 contains other information besides micro-instructions, including commands and codes which are to be applied to the peripheral devices 114 or to the IOC 106 and information which will enable the peripheral control unit 110 to operate with the peripheral devices.

The SPM 130 provides temporary storage for commands received from the CPU 102, for data being transferred between the CPU 102 and the peripheral devices 114, and generally for any information or parameters used in carrying out a data transfer operation. Scratch pad memories, as well as read only memories, are well known in the art.

The DLI control 134, as will be discussed in detail hereafter, provides the logic and storage necessary for interfacing with the peripheral devices 114 including device selector circuitry and an index register and index counter for providing the timing or strobe signals for writing data into or reading data from the peripheral devices. An exemplary data transfer operation will now be described as it might illustratively be performed by the peripheral subsystem of FIG. 1.

Assuming that the peripheral control unit is powered up and has been initialized (registers reset, SPM 130 [or at least portions thereof] cleared), a data transfer operation either to or from the peripheral devices 114 is initiated by the execution of a Connect instruction by the CPU 102. This instruction identifies, among other things, the channel program which is to define and control the data transfer operation. Execution of the Connect instruction involves determining the logical channel (peripheral control unit 110 and peripheral device) which is to take part in the operation, and then determining if the logical channel is "available" for performing the data transfer operation. The logical channel will not be available if execution of another channel program associated with the logical channel has been started or if another channel program has been placed in an initiation queue associated with the logical channel. If the logical channel is available, the channel program identified by the Connect instruction is placed in the initiation queue of the corresponding logical channel. This causes a control signal to be applied by the IOC 106 via the PSI control 118 to the microprocessor 126 indicating that a channel program is waiting to be initiated.

Upon receipt of the control signal indicating that a channel program is awaiting initiation, the microprocessor 126 issues an Initiate New Program service code to the IOC 106. This service code causes the IOC 106 to transfer to the microprocessor 126 a Set Function Mask command which includes the logical channel number (identifying the peripheral device which is to participate in the transaction) and the first entry (referred to as a channel command entry [CCE]) of the channel program.

From the logical channel number (which will have been stored in the SPM 130 of the microprocessor 126), the microprocessor identifies the specified peripheral device and causes the DLI control 134 to seize it. The first CCE (which is also stored in the SPM 130) identifies the operation to next be performed as a so-called Set Function Mask command operation.

To obtain the Function Mask from the IOC 106, the microprocessor 126 issues an Initiate Data Transfer service code to the IOC 106 after which the IOC transfers the Function Mask to the microprocessor 126. The Function Mask specifies, among other things, the mode of operation (transfer data characters of 6 or 8 bits, whether packing or unpacking is to be utilized, etc., and density of the data to be stored or retrieved from the peripheral device).

The microprocessor 126 verifies that the Function Mask defines a legitimate mode of operation (for example, by table look-up) and if it is determined that it is not legitimate, the channel program is aborted. If the command is determined to be legitimate, then the microprocessor 126 performs a routine verifying that no errors have occurred in the operation performed thus far. The microprocessor 126 then polls the selected peripheral device via the DLI control 134 to obtain from the device an indication of the device's operating speed (e.g., the tape speed if the selected device is a magnetic tape unit). This indication will hereafter be referred to as the speed constant of the device. From the speed constant and the density information included in the Set Function Mask command, the microprocessor 126 determines the rate at which data is to be written into or read from the selected device. This determination could illustratively be made by combining, in some arithmetic fashion, the speed constant and density information to obtain an ROM 122 address which stores information defining the read/write rate for the selected device. This information, referred to as the read/write pulse constant, as well as other information relating to the selected device, is read from the ROM 122 by the microprocessor 126 and stored in the SPM 130 for later use. For a magnetic tape peripheral device, the type of device information which would be stored along with the read/write pulse constant might include information defining the beginning of tape (BOT) gap, end of tape (EOT) gap, interrecord gaps, etc. (An interrecord gap is the longitudinal tape distance between data records [groups of related data]). Such gaps are generally different for different magnetic tape device models and, of course, must be "known" by the microprocessor 126 if it is to properly interface with different device models.

The microprocessor 126 next checks the Set Function Mask command, i.e., a particular bit in the command, to determine if additional commands are present in the channel program. Since, for a data transfer operation, more commands would be present, the microprocessor 126 causes the transfer of a Move Pointer service code to the IOC 106. In response, the IOC 106 transfers the next command of the channel program. At this point in the channel program, any one of a variety of commands may be transferred such as Initialize device, Load tape, and various tape positioning commands (assuming that the selected peripheral device were a magnetic tape unit).

Assuming that all operations necessary to prepare the selected peripheral device for either storage or reproduction of data have been completed, a Write or Read command is transferred from the IOC 106 to the microprocessor 126. If data is to be transferred from the CPU 102 to the selected peripheral device, then a Write command would be transferred. In response to this command, the microprocessor conditions certain logic in the DLI control 134 to prepare it for writing data into the selected peripheral device, issues a command to the selected peripheral device to start the device (for example, begin movement of the magnetic tape if the selected device is a magnetic tape unit), and issues an Initiate Data Transfer service code to the IOC 106. Data would then be applied to the PSI control 118 and to the microprocessor 126 for transfer to the selected peripheral device. The data would be applied to the peripheral device in accordance with the device information and the write pulse constant stored in the SPM 130. For example, the appropriate BOT, EOT and interrecord gaps would be provided and the data would be applied at the appropriate rate.

At the conclusion of the data transfer operation, a determination is made as to whether or not there are any more commands in the channel program and if not the channel program is terminated. This is accomplished by exchanging service codes and control signals between the IOC 106 and the peripheral control unit 110.

Execution of a Read command is similar to execution of a Write command except, of course, data is transferred in the opposite direction.

Figure 2:
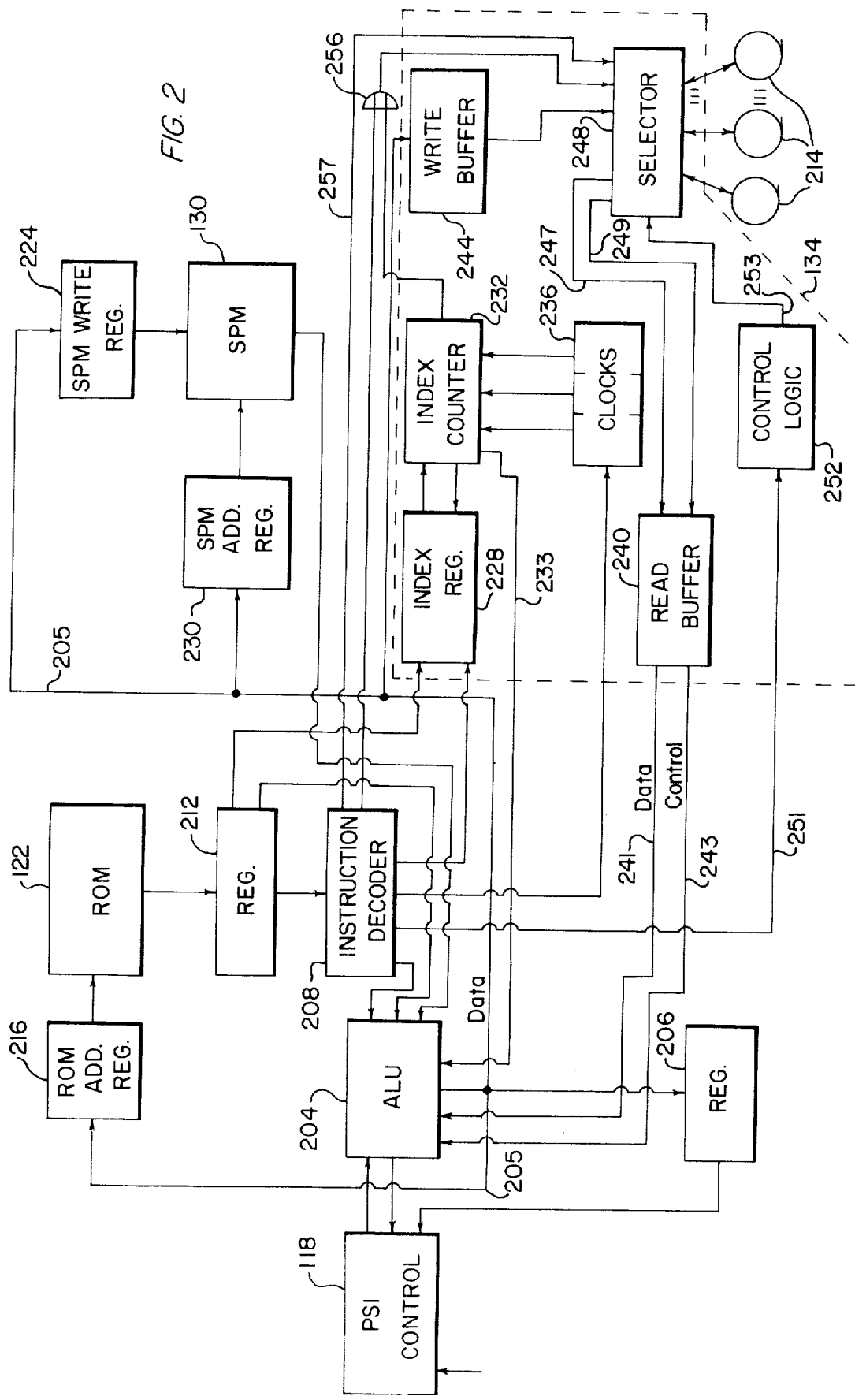
FIG. 2 shows a portion of the logic and circuitry of the device level interface control unit and microprocessor of FIG. 1 made in accordance with the principles of the present invention.

FIG. 2 shows detailed logic of the microprocessor 126 and the DLI control 134, along with the PSI control 118, the ROM 122, the SPM 130, and, for this embodiment, magnetic tape units 214. The DLI control is shown within the dotted line box identified by the numeral 134. The FIG. 2 logic includes an arithmetic logic unit (ALU) 204 which generally controls and supervises all logical and data transfer operations performed by the FIG. 2 logic. The ALU might illustratively be a SN 54181 logic circuit manufactured by Texas Instruments, Inc.

The ALU 204 receives data and control signals from the PSI control 118 and, in response thereto, may apply data or control signals by the lines 205 to one or more registers including a ROM register 216, a SPM address register 230, a SPM write register 224, a write buffer 244 and a register 206. (Just as in FIG. 1, each line in FIG. 2 which couples elements together generally represents a plurality of lines over which data or control signals are transferred. Whether plural or a single line is represented will be apparent as FIG. 2 is described). The ALU 204 also responds to data or control signals from various ones of the units of FIG. 2 by applying data or control signals to the registers previously identified or to the PSI control 118.

As previously discussed in connection with FIG. 1, micro-instructions defining operations to be performed by the peripheral control unit are stored in the ROM 122. The locations of the micro-instructions to be read from the ROM 122 and executed are identified by the ROM address register 216 under control of the ALU 204. That is, in response to signals from the ALU 204, the ROM address register 216 causes a micro-instruction (and possibly other data) to be read from the ROM and applied to a register 212 and also to an instruction decoder 208. The information applied to the register 212 may then be applied either to the ALU 204 or to an index register 228 under control of the instruction decoder 208. The instruction decoder decodes the information applied to it and, depending upon the information or instruction decoded, applies appropriate control signals to various ones of the units of FIG. 2. All micro-instructions are decoded by the instruction decoder 208 which then initiates the operation defined by the micro-instruction by signaling the appropriate equipment. Hereafter, although specific reference may not be made to the fact that a particular operation is being performed in accordance with a micro-instruction read from ROM 122, it should be understood that at least for operations performed by the ALU 204, this is the case. In other words, each time the ALU 204 applies data or control signals to one of the units of FIG. 2, it should be understood that it is doing so in response to a signal generated by the instruction decoder 208 as a result of a micro-instruction being decoded by the decoder. Microprocessing systems for carrying out the described functions are well known in the prior art. One such system is the Honeywell 4200 central processing unit.

The SPM address register 230 performs a function similar to that of the ROM address register 216 in that it responds to control signals from the ALU 204 and causes information to be read from the SPM 130 and applied to the ALU 204. Information is also stored in the SPM 130 at locations designated by the SPM address register 230. Such information is applied by the ALU 204, SPM write register 224 for subsequent transfer to and storage in the SPM 130 at locations designated or activated by the SPM address register 230. The functions of reading data from and writing data into storage units in the manner described are well known in the prior art.

The DLI control 134 includes the previously mentioned index register 228 which stores information which determines when strobe (read or write) pulses are to be generated by an index counter 232. The index counter 232 is set to a particular count depending upon the information stored in the index register 228 after which it commences to decrement (or increment) one count each time a pulse is received from one of a plurality of clocks 236. (The timing performed by the index counter 232 can, of course, be carried out by decrementing from an initial count to some predetermined lower count or by incrementing from an initial count to a predetermined higher count—the discussion here will assume that the counter decrements from its initial count). When the index counter 232 is decremented to a certain count, it applies a strobe pulse to an OR gate 256 which, in turn, applies the pulse to selector circuitry 248. The selected one of the clocks 236 activated to apply clock pulses to the index counter 232 is determined by the instruction decoder 208. Different clocks are selected depending upon the particular one of the peripheral devices 214 selected and upon what stage of a data transfer operation is being carried out, e.g., whether timing over the BOT gap, interrecord gap, etc., is to be done. This will be discussed in greater detail later.

Selection of a particular one of the peripheral devices 214 is controlled by the control logic unit 252 which, in response to signals from the instruction decoder 208, energizes particular portions of the selector circuitry 248 to enable transfer of data to or reading of data from the selected one of the peripheral devices 214. Data to be stored in a selected device is applied by the ALU 204 to the write buffer 244 and then via an activated portion of the selector circuitry 248 to the selected device. Strobe pulses from the index counter 232 are likewise applied via the activated portion of the selector circuitry 248 to the selected device. Data read from the selected device is transferred via an activated portion of the selector circuitry 248 to a read buffer 240 for ultimate transfer to the ALU 204.

The control logic unit 252 might illustratively include a plurality of bistable storage elements which are settable and resettable by the instruction decoder 208. Then, the condition of the bistable elements determine which portion of the selector circuitry 248 is to be enabled. For example, if three bistable elements were included, then eight different combinations or settings of the elements could be achieved—ranging from all three of the devices being in the "reset" condition to all three being in the "set" condition. Decoding circuitry in the control logic unit 252 would respond to each of the eight settings by activating a different one of eight output lines 253. This is conventional decoding circuitry. Line 253 interconnecting the control logic 252 and the selector circuitry 248, although shown as a single line, represents a plurality of lines each of which enables a different portion of the selector circuitry. Similarly, the line 251 could comprise a plurality of leads for setting and resetting different ones of the bistable devices of the control logic unit 252.

The circuitry of FIG. 2 will now be briefly described for a write operation i.e., a data transfer from the PSI control 118 to a selected one of the peripheral devices 214. Recall that after a channel program is placed in the initiation queue of a corresponding logical channel, a control signal is applied by the IOC 106 via the PSI control 118 to the microprocessor 126 (FIG. 1) in response to which the microprocessor 126 issues an Initiate New Program service code to the IOC 106. With reference to FIG. 2, this service code would, under control of the ALU 204, be read from the ROM 122 into the register 212 and then via the ALU 204, to the register 206 for transfer via the PSI control 118 to the IOC 106. The logical channel number and the first CCE of the channel program are then transferred via the PSI control 118 to the ALU 204 and ultimately to the SPM 130. (Recall that the logical channel number identifies the peripheral device in which data is to be stored or from which data is to be read). The ALU 204 then causes the logical channel number to be read for the SPM 130 and from this logical channel number the ALU generates an address which is applied to the ROM address register 216 to cause the contents of the location identified by the address to be applied by the ROM 122 to the register 212 and to the instruction decoder 208. (The address generated by the ALU 204 might simply be the identical data quantity as the logical channel number or some quantity obtained by performing a logical operation on the logical channel number. In either case, the logical channel number is utilized to identify a particular location in the ROM 122 from which certain desired information is to be read).

The information applied to the register 212 and the instruction decoder 208 is decoded by the instruction decoder which then applies control signals via lines 251 to the control logic unit 252 identifying the portion of the selector circuitry 248 which is to be enabled. In response to the signals, the control logic unit 252 enables the identified portion so that any data or control signals applied to the selector circuitry 248 from the write buffer 244, index counter 232 or instruction decoder 208 will be applied to a selected one of the peripheral devices 214 and so that any data or signals applied by the selected peripheral device to the selector circuitry 248 will be applied to the read buffer 240.

The ALU 204 then causes an Initiate Data Transfer service code to be read from the ROM 122 and applied via the PSI control 118 to the IOC 106. This causes the Function Mask (which includes density information defining the density which the data to be stored on tape is to have) to be applied via the PSI control 118 to the ALU 204 which then applies the information to the SPM 130. The ALU 204 next causes a Request Status command to be read from the ROM 122 and applied to the register 212 and the instruction decoder 208. The command is transferred from the register 212 via the ALU 204 to the write buffer 244 thereby presenting the command to the selected device. (As will become clear when discussing the detailed circuitry of the selector 248, when data is applied to the write buffer 244, such data is placed on lines electrically coupled via the enabled portion of the selector circuitry 248 to the selected peripheral device.) The instruction decoder 208 in response to the Request Status command read from the ROM 122, applies a write strobe or signal via the OR gate 256 and the selector circuitry 248 to the selected peripheral device. This signal informs the peripheral device that information (in this case the Request Status command) is present on the device's input lines. The instruction decoder 208 also applies a signal via lead 257 and the selector circuitry 248 to the selected device informing the device that the information present on its input lines is a command (rather than data to be stored). In response to the signals, the selected peripheral device decodes or otherwise processes the Request Status command and applies to its output lines 249 information defining the operating speed of the device (i.e., tape speed) referred to as the speed constant. The selected peripheral device also applies a signal (status strobe) to a so-called status line 247 to indicate that the requested information has been applied to the device's output lines. The Request Status command thus operates as an interrogation signal causing the peripheral device to produce certain information.

The requested information and the status strobe are applied to the read buffer 240 which then applies the information to data output lines 241 and applies a control signal to one of the control lines 243 to indicate to the ALU 204 that the requested information has been received. As a result, the ALU 204 applies the information on the lines 241 to the SPM 130.

From the density information (which has part of the Function Mask) and the speed constant, now stored in the SPM 130, the ALU 240 can generate information needed to transfer data into the selected peripheral device. This is done by the ALU 204 causing the density information and the speed constant to be read from the SPM 130 into register (not shown) of the ALU 204. The ALU 204 then combines the density information and speed constant in some arithmetic manner to derive a unique ROM 122 address. The combining may be simple addition of the numerical values represented by the speed constant and density information to obtain a sum which would have been predetermined to give the desired ROM 122 address. The location in the ROM 122 defined by this address contains a write pulse constant, which defines the rate at which data is to be written into the selected device, and other device constants (such as BOT, EOT constants, etc., as discussed earlier). These constants are read from the ROM 122 and applied to the SPM 130.

It is clear that from the density information and the tape speed constant, the rate at which data should be applied to the tape to achieve the indicated density can be determined. If data were to be stored at some predetermined density in all peripheral devices, then, of course, no density information would need to be received from the CPU 102 and the rate at which data was to be applied to a selected device could be determined solely from the device's speed constant.

A particular bit in the Set Function Mask command is then checked by the ALU 204 to determine if additional commands are present in the channel program. Since, for the data transfer operation, more commands would be present, the ALU 204 causes the transfer of a Move Pointer service code from the ROM 122 to the PSI control 118 and ultimately to the IOC 106. In response, the IOC 106 transfers the next command of the channel program to the PSI control 118 and to the ALU 204. At this point in the channel program, any one of a variety of commands may be transferred such as Initialize device, Load tape, and various tape positioning commands.

Assuming that all operations necessary to prepare the peripheral device for either storage or reproduction of the data have been completed, a Write command is transferred from the IOC to the ALU 204. Since it is assumed that the selected peripheral device is prepared for the storage of data, i.e., the magnetic tape is loaded and positioned at the BOT marker, the next operation to take place is the starting of movement of the tape through the BOT gap. To do this, the ALU 204, in response to the Write command received from the IOC 106, causes a next instruction to be read from the ROM 122. The instruction decoder 208 decodes this instruction and signals the ALU 204 to cause the BOT constant stored in the SPM 130 to be applied to the index register 228. The instruction decoder 208 also causes the index register 228 to apply this constant to the index counter 232 to set the index counter at a count defined by the BOT constant. The ALU 204 then causes a Write command (different from the one received from the IOC 106) to be read from the ROM 122 and placed in the write buffer 224. The instruction decoder 208, after decoding another instruction received from the ROM 122, applies, via the selector circuitry 248 to the selected device, a strobe pulse and a signal indicating that the information being presented to the selected device by the write buffer is a command. The selected device then responds to the Write command received from the Write buffer 244, by starting movement of its tape. The instruction decoder 208 activates one of the clocks 236 to outpulse to the index counter 232. The particular clock selected would be the one used for timing over BOT gaps and since BOT gaps are relatively long compared, for example, to interrecord gaps, the interval between clock pulses would be fairly long. With each pulse applied to the index counter 232, the counter decrements by one as earlier described.

While the index counter 232 is decrementing, the ALU 204 causes an Initiate Data Transfer service code to be read from the ROM 122 and applied via the PSI control 118 to the IOC 106. In response thereto, the IOC 106 causes the data (or a portion thereof) which is to be stored in the selected peripheral device to be applied via the PSI control 118 to the ALU for temporary storage in the SPM 130. When the index counter 232 decrements to a predetermined count (times out), the counter signals the ALU 204 via lead 233. The ALU 204, in response to such signal, causes a first character of data to be read from the SPM 130 and applied to the write buffer 244. The ALU 204 also causes the write pulse constant to be read from the SPM 130 into the index register 228. The instruction decoder 208, upon decoding an instruction which will have been read into the register 212, signals the index register 228 to apply the write pulse constant to the index counter 232 to set the counter at the value specified by the write pulse constant. The instruction decoder 208 also resets the clock previously activated and activates another one of the clocks 236 to begin outpulsing to the index counter 232. The particular clock selected is the one provided for measuring the distance between characters to be stored on the tape. Since this distance is relatively small, the time between pulses generated by the activated clocks is short.

The index counter 232 decrements with each pulse received from the activated clock. When the index counter 232 times out again, it applies a strobe pulse via the OR gate 256 and the selector circuitry 248 to the selected peripheral device causing the selected device to store the data character present in the write buffer 244.

Each time the index counter 232 times out and applies a strobe pulse to the OR gate 256, it also applies a pulse to the index register 228 to cause the index register to again apply the write pulse constant to the index counter 232 to reset the counter. The next data character is then applied to the write buffer 244 (as a result of the index counter 232 signaling the ALU 203 via lead 233) awaiting time-out of the index counter 232 at which time the character will be applied to the selected peripheral device.

The above-described process of applying data to the peripheral device continues until a complete data record has been transferred to the device. After a data record has been transferred, the ALU 204 causes the interrecord gap constant of the selected device to be read from the SPM 130 into the index register 228.

This constant is then applied to the index counter 232 to set the counter at the value specified by the constant. The activated one of the clocks 236 may be reset and a different clock activated or the already activated clock may simply be allowed to continue outpulsing depending upon the timing needs for the interrecord gap. In either case, the index counter 232 commences to decrement with the received clock pulses. Assuming that another data record is to be transferred to the selected peripheral device, after the index counter 232 "times" over the interrecord gap, (and after a Write command is received by the ALU 204 from the IOC 106 to, in effect, indicate that another data record is to be transferred to the peripheral device), the index counter signals the ALU 204. In response, the ALU 204 causes the write pulse constant to be placed in the index register 228 and then in the index counter 232 and also causes the first data character of the next data record to be read from the SPM 130 and applied to the write buffer 244. The process of applying the next data record to the peripheral device is carried out in the same manner as described above for the first data record.

It may be necessary during the course of storing the data for more data to be transferred from the IOC 106 to the ALU 204 and the SPM 130. This can be done while the operation of writing the data on to the tape is being carried out.

When all data which is to be stored on the tape is applied by the IOC 106 via the PSI control 118 to the ALU 204 and SPM 130, the PSI control signals the ALU that no more data is to be transferred. Then after the last data character of the last record has been transferred to the peripheral device, the ALU 204 causes the final gap constant to be read from the SPM 130 to the index register 238. The constant is applied to the index counter 232 to set the counter to the value specified by the constant after which a particular one of the clocks 236 is activated to commence outpulsing to the index counter 232. When the index counter 232 times out, it signals the ALU 204 which then causes a Stop command to be read from the ROM 122 into the write buffer 244. The instruction decoder 208, upon decoding such command, applies a strobe pulse via the OR gate 256 and selector circuitry 248 to the selected device. The selected device responds to the receipt of the Stop command by stopping the tape movement.

A read operation is carried out in a fashion similar to that of the write operation except, of course, data is retrieved from a selected peripheral device for transfer to the IOC 106. Just as in the case of the write operation, the selected peripheral device is polled or interrogated to obtain the device's speed constant which, along with density information, is used to obtain device constants necessary for retrieving data from the device. These constants are used to condition the index counter 232 for the generation of timing pulses at the appropriate times. The read pulse constant, which determines the rate at which data is to be read from the peripheral device, is of the same value as the write pulse constant.

Data retrieved from the peripheral device is applied via the selector circuitry 248 to the read bubber 240 and from there via the ALU 204 to the SPM 130. The data is then applied by the ALU 204 to the PSI control 118 for transfer to the IOC 106.

Figure 3:
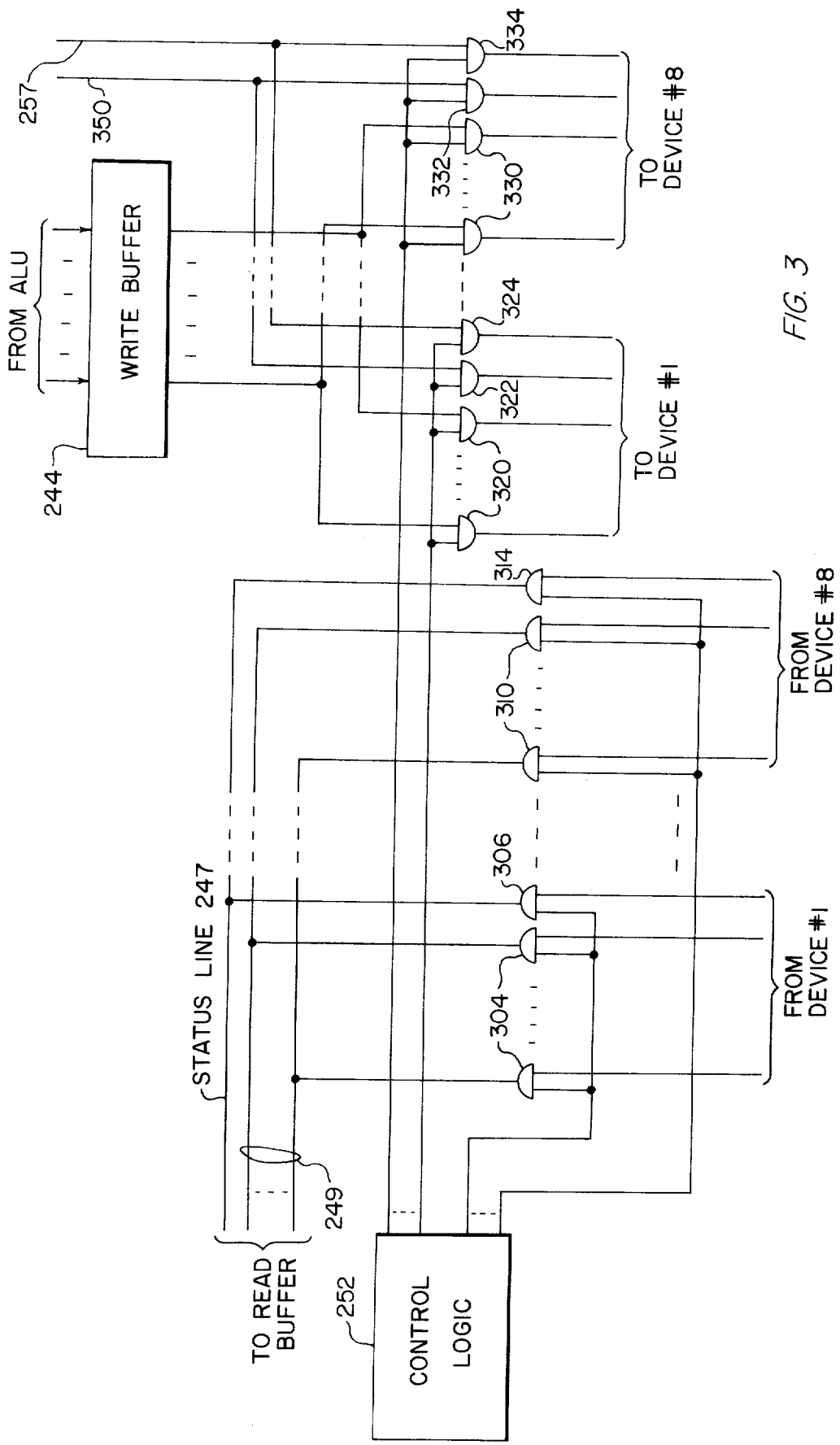
FIG. 3 shows one illustrative embodiment of the selector circuitry of FIG. 2.

FIG. 3 shows a detailed configuration of the selector circuitry 248 of FIG. 2. The configuration shows the selector circuitry connected to eight different peripheral devices. For example, AND gates 304 and 306 are coupled to the output lines and status line respectively of device number 1. Similar AND gates are coupled to the other peripheral devices. The outputs of each group of AND gates 304, . . . , and 310 are coupled to corresponding ones of the lines 249. The outputs of each of the AND gates 306, . . . , and 314 are coupled to the status line 247.

AND gates 320, 322 and 324 are coupled to the input lines, strobe, and data/command information lines respectively of device number 1. Similar AND gates are coupled to each of the other devices. The output of the write buffer 244 is connected to each group of AND gates 320, . . . , and 330. A strobe line 350 from the OR gate 256 (FIG. 2) is coupled to AND gates 322, . . . , and 334. Line 257 is similarly coupled to corresponding AND gates.

Although no driver or receiver circuitry is shown for applying data or command to or receiving data or commands from the peripheral devices, it should be understood that such circuitry may be included at the input side or output side of the selector circuitry of FIG. 3.

Selection of the device, to which information is to be applied or from which information is to be retrieved, is accomplished simply by the control logic 252 enabling a particular set of the AND gates of the selector circuitry. For example, if device number 1 is the device to which information is to be applied, then the control logic 252 would apply an enabling signal to AND gates 320, 322 and 324. Information placed in the write buffer 244 would then be presented to the input lines of device number 1 and, upon application of a strobe pulse to lead 350, the device would be caused to receive such information. Selection of a peripheral device from which information is to be retrieved is carried out in a similar fashion. For example, if information were to be retrieved from device number 1, the control logic 252 would apply an enabling signal to AND gates 304 and 306 so that any information on the output lines of the device would be applied to the lines 249 and 247 for transfer to the read buffer 240 of FIG. 2.

Figure 4:
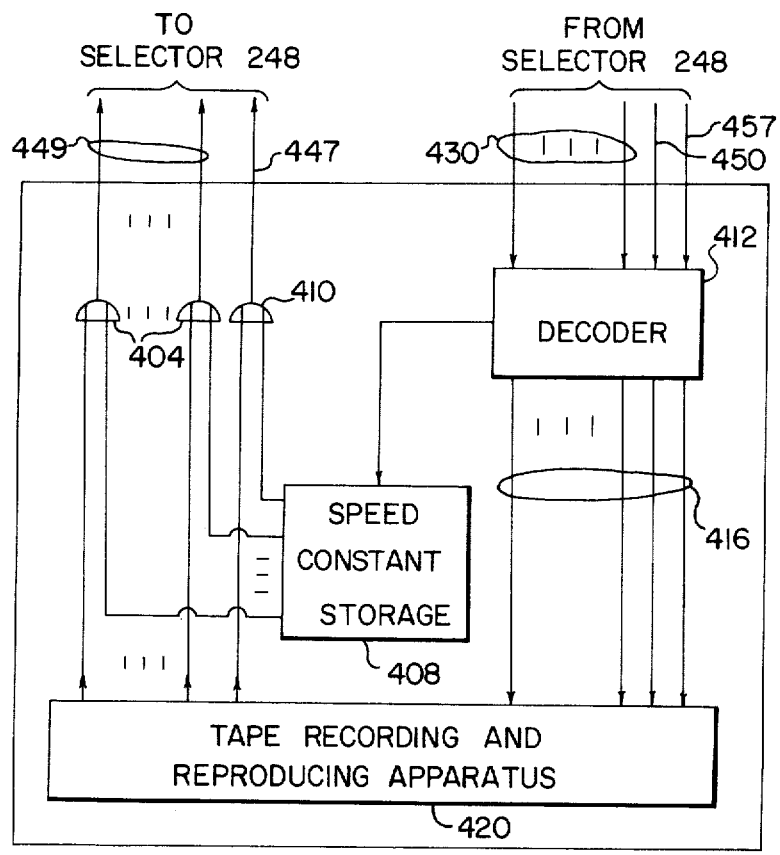
FIG. 4 shows one illustrative embodiment of one of the peripheral devices of FIG. 2 made in accordance with the principles of the present invention.

FIG. 4 shows exemplary peripheral device logic for supplying the device's speed constant to the associated peripheral control unit. This logic includes a decoder 412 for receiving information applied to write lines 430 from the selector 248, strobe pulses applied to lead 450 and a data/command signal applied to lead 457. Such information and signals may, in turn, be applied to corresponding decoder output lines 416 for transfer to tape recording and reproducing apparatus 420. The apparatus 420 is simply the well known tape drive, recording head, reading head, etc., equipment of a standard magnetic tape unit.

The logic also includes a device speed constant storage unit 408 which stores (as the name indicates) the speed constant of the device. The outputs of the speed constant storage unit 408 are coupled to a plurality of OR gates 404 and 410 which, in turn, are coupled to the output lines 449 of the device and to status line 447 respectively.

To further clarify the connections of the peripheral device shown in FIG. 4 to the selector 248 of FIG. 3, assume that the peripheral device of FIG. 4 is device number 1. In such case, lines 430 would be coupled to AND gates 320 of FIG. 3, line 450 would be coupled to AND gate 322 and line 457 would be coupled to AND gate 324. Also, lines 449 of the FIG. 4 device would be coupled to AND gates 304 of FIG. 3 and line 447 would be coupled to AND gate 306 of FIG. 3.

Recall that after the peripheral control unit receives the Function Mask, it applies the Request Status command to the selected peripheral device. This command is applied via lines 430 to the decoder 412 which, upon receipt of a strobe pulse over line 450, decodes the Request Status command and applies a signal to the speed constant storage unit 408. The speed constant storage unit 408, in response to such signal, applies the device's speed constant stored therein to OR gates 404 and applies a status pulse to OR gate 410. The speed constant and status pulse are thereby applied respectively to lines 449 and 447 for ultimate transfer to the read buffer 240 of FIG. 2. In this manner, a device's speed constant is retrieved from the device for use as described earlier.

It should be understood that various arrangements could be provided in the peripheral devices for supplying a device's speed constant to the peripheral control unit. For example, the decoder 412 and speed constant storage unit 408 could be replaced by a translator which, upon receipt of the Request Status command, translates the command into the device's speed constant for application to the peripheral control unit.

In the manner shown and described, read and write operations in a peripheral subsystem may be varied and controlled in accordance with the type of peripheral device included in the subsystem. Before data is applied to or retrieved from a selected device, an indication of the read/write speed of that device is obtained by the peripheral control unit and from this indication and a density designation received from a central processing unit, a read/write pulse constant is produced for controlling the rate at which data is to be read from or applied to the device. With this arrangement, devices having different operation speeds can be coupled into or removed from the peripheral subsystem without the need for making any logic changes in the peripheral control unit.

It should be understood that the embodiments described herein are only illustrative of the principles of the present invention. Numerous modifications and changes could be made without departing from the spirit and scope of the invention. The appended claims are intended to cover all such modifications and changes.

What is claimed is:

1. In a data processing system which includes a central processing unit for issuing commands, a peripheral subsystem comprising a plurality of data storage devices, each for operating at a certain speed to record and reproduce data and including means responsive to an interrogation signal for producing a signal indication of the operating speed of the device, means responsive to a command issued by the central processing unit for applying an interrogation signal to a selected one of said data storage devices, data register means, and means responsive to the signal indication produced by the selected device for transferring data between the selected device and the data register means at a rate specified by the signal indication for execution of said commands.

2. Apparatus as in claim 1 wherein each of said data storage devices includes means for recording or reproducing an item of data each time a strobe pulse is applied to the device, and wherein said data transferring means comprises means for storing read/write pulse indices for each data storage device, each of said indices defining the intervals at which strobe pulses are to be applied to the corresponding device for causing the device to record or reproduce data, means responsive to the receipt of a read/write pulse index for applying strobe pulses to the selected data storage device at intervals defined by the index, and means responsive to the signal indication produced by the selected device for reading said index from said storing means and applying the index to said strobe pulse applying means.

3. Apparatus as in claim 2 wherein each of said data storage devices further comprises output lines coupled to said data transferring means, means for storing a signal indication of the operating speed of the device, and means responsive to an interrogation signal for causing said signal indication storing means to apply the stored signal indication to the output lines.

4. In a data processing system which includes a central processing unit for issuing commands, a peripheral subsystem comprising a plurality of peripheral devices, each of which operates at some speed to record or reproduce data each time a strobe pulse is received, and each of which includes means responsive to an interrogation signal for producing a speed constant signal specifying the operating speed of the device, means responsive to a command issued by said central processing unit for applying an interrogation signal to a selected one of the peripheral devices to cause the selected device to produce a speed constant signal, means for storing density information received in a command from the central processing unit and for storing the speed constant signal produced by the selected peripheral device, said density information specifying the density of data to be applied to or read from the selected peripheral device, a memory for storing a plurality of data rate indices at different locations in the memory, means for combining the density information and the speed constant signal to obtain a resultant identifying a location in said memory containing one of said data rate indices, means for retrieving said one data rate index from the identified location in said memory, and means for applying strobe pulses to the selected peripheral device at intervals defined by said one data rate index for execution of said commands.

5. Apparatus as in claim 4 wherein said strobe pulse applying means includes means for receiving and storing said one data rate index, a counter, means for applying said one data rate index to said counter to set the counter to a count defined by said one data rate index, clock means for applying pulses to said counter to cause said counter to decrement to a predetermined count, said counter generating a strobe pulse upon decrementing to said predetermined count.

6. Apparatus as in claim 4 further including a first buffer register for temporarily storing data to be applied to and recorded in the selected peripheral device, a second buffer register for temporarily storing data reproduced by the selected peripheral device, and means responsive to a command from said central processing unit for coupling the first and second buffer registers to the selected peripheral device to enable transfer of data from the first buffer register to the selected device and the transfer of data from the selected device to the second buffer register.

7. Apparatus as in claim 6 wherein each of said peripheral devices comprises output lines connected to said coupling means, decoder means for generating an output signal each time an interrogation signal is received from said interrogation signal applying means, and means for storing a speed constant signal specifying the operating speed of the device and for applying the speed constant signal to said output lines each time an output signal is generated by said decoder means.

8. In a data processing system having a central processing unit for issuing commands including a first command which identifies a selected peripheral device and a second command which includes a data density code, a magnetic tape peripheral subsystem comprising
   a plurality of magnetic tape devices, each of which operates to transport magnetic tape at some speed to record and reproduce data, the data being recorded or reproduced each time a strobe pulse is received by the device, each device including means responsive to an interrogation command for producing a speed constant signal specifying the tape speed of the device,
   buffer register means for temporarily storing data and commands to be applied to the magnetic tape devices and for temporarily storing data and signals reproduced by the magnetic tape devices,
   means responsive to said first command issued by the central processing unit for coupling said buffer register means with a selected magnetic tape device specified in said first command,
   first memory means for storing an interrogation command and a plurality of sets of device constants, each set defining data storage and reproduction timing information for one or more of the magnetic tape devices, each device constant specifying a time interval,
   means responsive to the second command issued by the central processing unit for retrieving the interrogation command from said first memory means and applying the interrogation command to the buffer register means for application to the selected magnetic tape device to cause the device to produce a speed constant signal,
   second memory means for storing the density code included in said second command and the speed constant signal produced by the selected magnetic tape device,
   means for combining the density code and the speed constant signal to produce a resultant identifying a location in said first memory means containing a set of device constants for the selected magnetic tape device,
   means for retrieving the set of device constants stored in the identified location, and
   means for applying strobe pulses to the selected magnetic tape device with the intervals between the strobe pulses being determined by the device constants of the retrieved set for execution of said commands.

9. In a data processing system comprising a central processing unit for issuing commands, a plurality of peripheral devices, each for recording and reproducing data and for producing a speed constant signal specifying the operating speed of the device, and a peripheral control unit for transferring data between the central processing unit and the peripheral devices in response to the commands from the central processing unit, a method of applying data to and reading data from the peripheral devices at differing rates depending upon the selected device comprising the steps of
   a. supplying to the peripheral control unit a command coming from the central processing unit which identifies a particular peripheral device,
   b. applying an interrogation signal from the peripheral control unit to the particular peripheral device identified in the command,
   c. transmitting a speed constant signal to the peripheral control unit from the particular peripheral device, and
   d. applying data to or reading data from the particular peripheral device under control of the peripheral control unit and at a rate determined by the speed constant signal supplied by the particular peripheral device for execution of said commands wherein step (d) further comprises
      1. recording or reproducing item of data in the particular peripheral device upon receipt of a strobe pulse,
      2. producing a read/write pulse index in the peripheral control unit determined by the speed constant signal transmitted from the particular peripheral device, and
      3. applying strobe pulses from the peripheral control unit to the particular peripheral device at intervals determined by the read/write pulse index.

10. In a data processing system comprising a central processing unit, a plurality of peripheral devices, and a peripheral control unit interconnecting the central processing unit and the peripheral devices, a method of transferring data between the peripheral control unit and the peripheral devices at differing rates depending upon the selected device comprising the steps of
    a. transmitting density information from the central processing unit to the peripheral control unit specifying the density of data to be transferred between the peripheral control unit and a selected peripheral device,
    b. applying an interrogation signal from the peripheral control unit to the selected peripheral device,
    c. transmitting from the selected peripheral device to the peripheral control unit a speed constant signal,
    d. storing a plurality of data rate indices at different locations in a memory located within the peripheral control unit,
    e. combining the density information and the speed constant signal to obtain a resultant which identifies a location in the memory containing one of the data rate indices, and
    f. transferring data between the selected peripheral device and the peripheral control unit for execution of said commands at a rate defined by the data rate index contained in the identified memory location.

11. The method of claim 10 wherein step (f) comprises the steps of
    g. setting a counter to a count defined by the data rate index contained in the identified memory location,
    h. decrementing said counter to a predetermined count and thereafter applying a strobe pulse to the selected peripheral device, i. the selected peripheral device, in response to the strobe pulse, recording a data character supplied by the peripheral control unit, and j. repeating steps (g) through (i) until a predetermined number of data characters have been recorded by the peripheral device.

* * * * *